United States Patent
Kim et al.

(10) Patent No.: US 8,985,487 B2
(45) Date of Patent: Mar. 24, 2015

(54) APPARATUS FOR SELECTIVELY SEPARATING POLYURETHANE FOAM AND FIBER FROM AUTOMOBILE SHREDDER RESIDUE

(75) Inventors: Kyungnam Kim, Seoul (KR); June Ho Yang, Seoul (KR); Hong Mo Koo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 499 days.

(21) Appl. No.: 13/285,637

(22) Filed: Oct. 31, 2011

(65) Prior Publication Data

US 2013/0026262 A1    Jan. 31, 2013

(30) Foreign Application Priority Data

Jul. 26, 2011    (KR) .......................... 10-2011-0074297

(51) Int. Cl.
| | | |
|---|---|---|
| *B02C 13/00* | (2006.01) | |
| *B02C 23/14* | (2006.01) | |
| *B29B 17/02* | (2006.01) | |
| *B09B 3/00* | (2006.01) | |
| *B29B 17/04* | (2006.01) | |
| *B29K 75/00* | (2006.01) | |
| *B29K 105/04* | (2006.01) | |
| *B03B 9/06* | (2006.01) | |
| *B29L 31/30* | (2006.01) | |

(52) U.S. Cl.
CPC . *B29B 17/02* (2013.01); *B09B 3/00* (2013.01); *B29B 17/0404* (2013.01); *B29K 2075/00* (2013.01); *B29K 2105/04* (2013.01); *B03B 2009/068* (2013.01); *B29L 2031/3055* (2013.01)

USPC .................... 241/29; 241/77; 241/79; 241/81

(58) Field of Classification Search
USPC ............. 241/77, 79, 81, 29, 30; 209/12.1, 21, 209/30, 31

See application file for complete search history.

(56) References Cited

U.S. PATENT DOCUMENTS

| | | | | |
|---|---|---|---|---|
| 5,443,157 | A  * | 8/1995 | Baker et al. .................. | 209/12.1 |
| 5,900,604 | A  * | 5/1999 | McNeill ........................ | 209/164 |
| 7,172,074 | B2 * | 2/2007 | Bittencourt ................... | 209/164 |
| 2011/0024531 | A1* | 2/2011 | Valerio ....................... | 241/24.25 |

FOREIGN PATENT DOCUMENTS

| | | |
|---|---|---|
| JP | 2003-236837 A | 8/2003 |
| JP | 2003236517 A | 8/2003 |
| KR | 10-0312821 | 10/2001 |
| KR | 10-2005-0048448 | 5/2005 |
| KR | 10-0953665 | 4/2010 |

* cited by examiner

*Primary Examiner* — Faye Francis
(74) *Attorney, Agent, or Firm* — Mintz Levin Cohn Ferris Glovsky and Popeo, P.C.; Peter F. Corless

(57) ABSTRACT

The present invention provides an apparatus for selectively separating polyurethane foam and fiber from Automobile Shredder Residue (ASR). The apparatus includes a first separator, a second separator, and a third separator. The first separator primarily separates fine particles, such as dirt or glass pieces, from the ASR at a front portion thereof and separates large-sized polyurethane foam and fiber from the ASR at a rear portion thereof. The second separator grinds remaining materials after the primary separation of the first separator. The third separator separates medium-sized polyurethane foam and fiber from the remaining materials after the separation of the first separator and secondarily separates plastics, rubber, and other materials.

3 Claims, 2 Drawing Sheets

[EARTH AND SAND]

[PLASTIC/RUBBER]

[COMPOSITE]

[FIBER]

[POLYURETHANE FOAM]

APPARATUS FOR SELECTIVELY SEPARATING POLYURETHANE FOAM AND FIBER FROM AUTOMOBILE SHREDDER RESIDUE

CROSS-REFERENCE TO RELATED APPLICATION

This application claims under 35 U.S.C. §119(a) the benefit of Korean Patent Application No. 10-2011-0074297 filed Jul. 26, 2011, the entire contents of which are incorporated herein by reference.

BACKGROUND (a) Technical Field

The present invention relates to an apparatus and method for selectively separating polyurethane foam and fiber from Automobile Shredder Residue (ASR). More particularly, it relates to an apparatus and method for selectively separating polyurethane foam and fiber from ASR, which can improve a recycling rate of a scrapped vehicle.

(b) Background Art

Scrapped vehicles are generally transferred to junkyards, where their recyclable parts, hazardous liquids such as fuel and oil, and tires are collected. Engines and transmissions made of metal materials are typically disassembled for recycling. Residual bodies are transferred to a shredding facility to undergo processes such as crushing and grinding, magnetic separation, whirling separation, and screen separation. During the above procedure, valuable metals such as ferrous metals and nonferrous metals are recovered. Other residues, such as plastics, rubber, glass, and fiber that are generated during the above processes, are called Automobile Shredder Residue (ASR).

The component ratio of ASR Light Fluff generated from scrapped vehicles is represented in Table 1.

TABLE 1

| | Weight (g) | Ratio (%) | Remarks |
|---|---|---|---|
| Metal | 164.0 | 1.6 | Ferrous/Nonferrous Metals |
| Plastic | 4,407.0 | 44.1 | |
| PVC | 175.0 | 1.8 | Bumper Cover and Interior/Chassis part |
| Laminated Material | 393.0 | 3.9 | |
| Fiber | 1,980.0 | 19.8 | Carpet and Mat |
| PU Foam | 1,750.0 | 17.5 | Seat Covering, Felts, Seat Foam, and Other Sponge |
| Rubber | 351.0 | 3.5 | Weather Strip, Hose, and O/S Bumper |
| Wire | 291.0 | 2.9 | Waste Wire and Copper Wire |
| Paper | 57.0 | 0.5 | General Waste |
| Paper/Wood | 146.0 | 1.5 | General Waste and Natural Wood |
| Loss | 286.0 | 2.9 | During Separation of materials, Dirt |
| Total | 10000.0 | 100.0 | |

In 2008, the Korean Act on Resource Circulation of Electrical and Electronic Equipment and Vehicles was enforced. The Act mandated an 85 percent recycling ratio with respect to the weight of a scrapped vehicle, and further required reporting to the government whether the recycling ratio was achieved.

As shown Table 1, ASR Light Fluff includes various materials such as metal, plastic, PVC, fiber, rubber, wire, paper, and wood. In order to meet the requirement of the recycling ratio of about 85%, shredding facilities are spending a lot of time and money to separate ASR. Typical separation apparatuses have a limitation in separating materials such as metals and plastics from residues that are mixtures. Also, since equipment for separating other residues by material type is absent, most residues from scrapped vehicles are simply buried or incinerated.

For example, vehicles include a fiber content of about 23 kg per vehicle. However, because there is no apparatus to selectively separate fiber from vehicles, about 11,500 tons of fiber is discarded annually.

Also, while fiber is manually separated by some facilities, the efficiency of manually separating polyurethane foam and fiber is low, and requires a considerable amount of time to collect the fiber. Accordingly, most polyurethane foam and fiber is currently incinerated.

Furthermore, it is difficult to obtain a high purity target material (i.e. separated material) due to contamination and mixture with other materials such as glass or dirt.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an apparatus and method for selectively separating polyurethane foam and fiber from Automobile Shredder Residue (ASR). The present apparatus and method saves costs for reducing waste and processing waste, and further improves the recycling ratio of a scrapped vehicle by mechanically selecting and extracting fiber and polyurethane foam using fiber-dedicated equipment.

In one aspect, the present invention provides an apparatus for selectively separating polyurethane foam and fiber from Automobile Shredder Residue (ASR), the apparatus including: a first separator configured for primarily separating fine particles, such as dirt and glass pieces, from the ASR at a front portion thereof and for separating large-sized polyurethane foam and fiber from the ASR at a rear portion thereof; a second separator configured for grinding remaining materials after the primary separation by the first separator; and a third separator configured for separating medium-sized polyurethane foam and fiber from the remaining materials after the primary separation of the first separator, and also for secondarily separating plastics, rubber, and other materials.

In an exemplary embodiment, the first separator may selectively separate polyurethane foam and fiber from the ASR using a rake-shaped (i.e. having a plurality of teeth or blades which are provided in any suitable variety of shape, size, number and arrangement) fiber separator.

In another exemplary embodiment, the second separator may be disposed between the first separator and the third separator and may include a first grinder having a shaft with a knife-like part disposed at an upper portion thereof, and a second grinder having a plurality of shafts (e.g., in on embodiment three shafts) each with a knife-like part disposed at a lower portion thereof. In accordance with an embodiment of the invention, the ASR remaining after the separation of the first separator may then be crushed and ground by the first and second grinders.

In still another exemplary embodiment, the third separator may include a roller-type fiber separator configured and arranged for sorting the ASR by size (e.g. in accordance to an interval provided between rollers), and an airflow and mesh plate-type separator for performing selective separation according to a weight of the ASR (e.g., using air/wind and selectively separating the ASR by size according to the mesh size of a mesh plate).

In yet another exemplary embodiment, the ASR may be classified into polyurethane foam and fiber by the first separator and the third separator, and may be collected by a dust collector to allow the polyurethane foam to be finally separated from the ASR.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
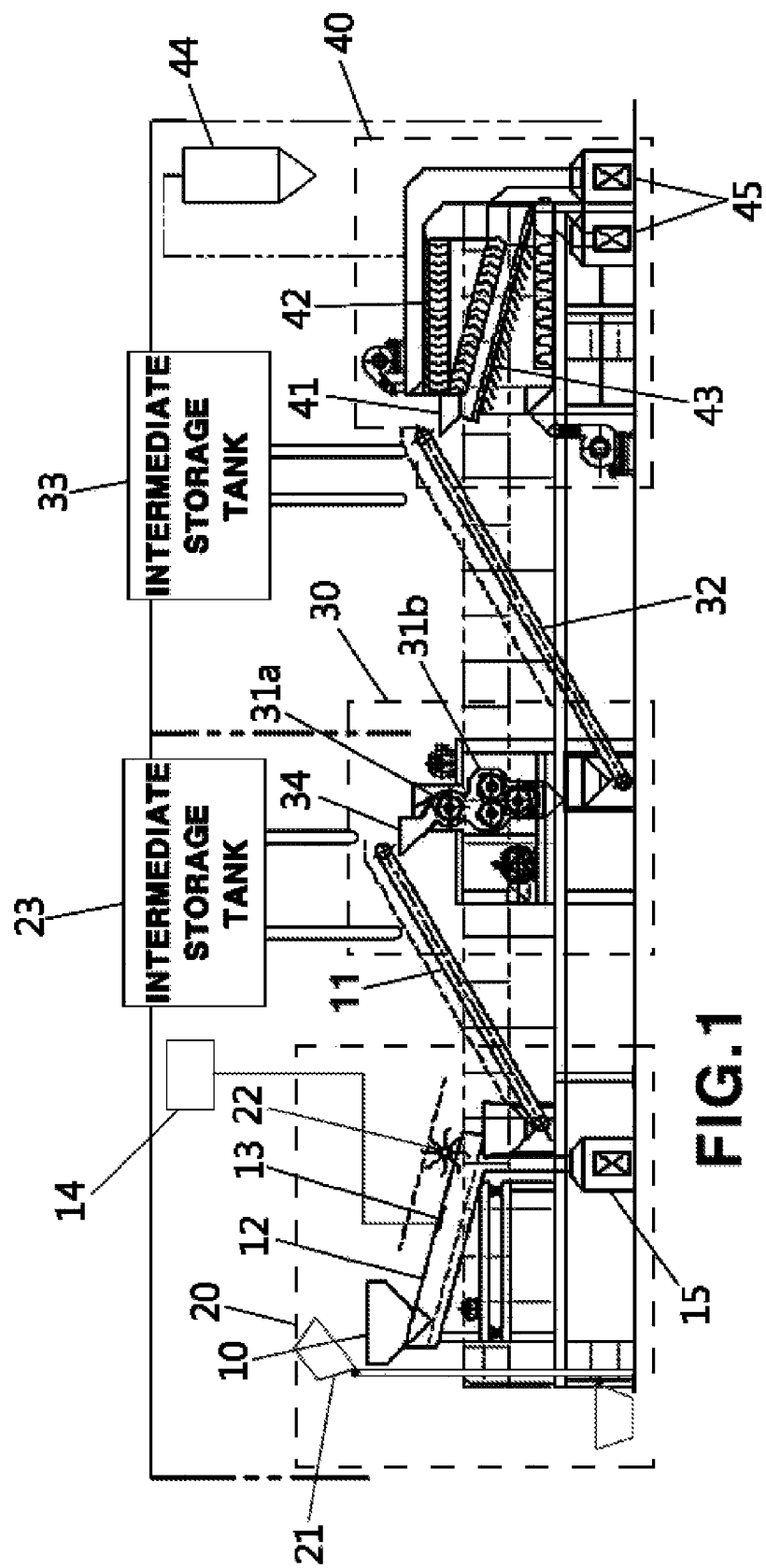
FIG. 1 is a diagram illustrating an apparatus for selectively separating polyurethane foam and fiber from Automobile Shredder Residue (ASR) according to an embodiment of the present invention.

Reference numerals set forth in the Drawings includes reference to the following elements as further discussed below:

| | |
|---|---|
| 10: first hopper | 11: first transfer conveyer |
| 12: vibration separator | 13: magnetic separator |
| 14: metal collection box | 15: foreign substance collection box |
| 20: first separator | 21: bucket feeder |
| 22: rake-shaped fiber separator | |
| 23: first intermediate storage tank | 30: second separator |
| 31a: first grinder | 31b: second grinder |
| 32: second transfer conveyer | 33: second intermediate storage tank |
| 34: second hopper | 40: third separator |
| 41: input hopper | 42: fiber separator |
| 43: airflow and mesh plate-type separator | |
| 44: dust collector | 45: polyurethane collection box |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Figure 2:
FIG. 2 is a diagram illustrating types of materials separated by the apparatus of FIG. 1.
Figure 2:
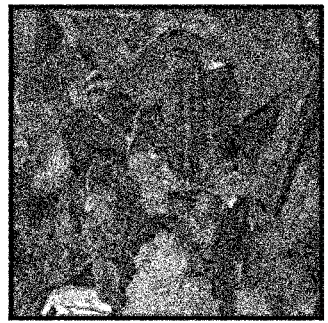
Figure 2:
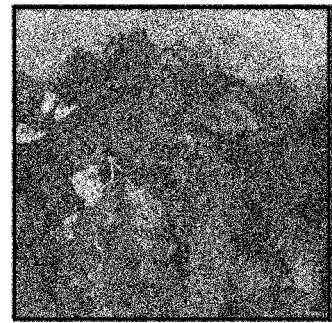
Figure 2:
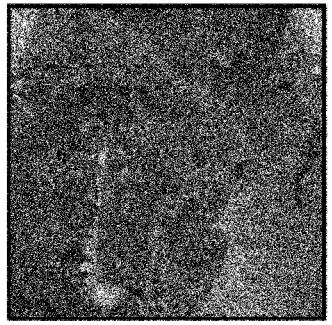
Figure 2:
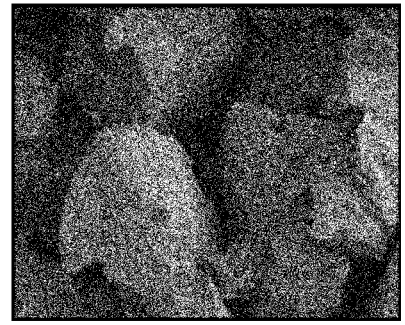

FIG. 1 is a diagram illustrating an apparatus for selectively separating polyurethane foam and fiber from Automobile Shredder Residue (ASR) according to an embodiment of the present invention, and FIG. 2 is a diagram illustrating types of materials separated by the apparatus of FIG. 1.

The present invention relates to an apparatus and method for selectively separating polyurethane foam and fiber from Automobile Shredder Residue (ASR). The present apparatus and method improves the recycling rate of a scrapped vehicle by mechanically and automatically extracting polyurethane foam and fiber from ASR, and efficiently recycles ASR.

An apparatus for selectively separating polyurethane foam and fiber from ASR may include a first separator 20, a second separator 30, and a third separator 40 that are configured and arranged to separate fiber from ASR by stages, particularly through fibroid material classification.

ASR may include dirt, glass pieces, metals, polyurethane foam, fiber, plastics, rubber, and other foreign substances.

Target materials for separation from ASR may include polyurethane foam and fiber, which account for large portions of ASR and which are valuable for recycling. The fibroid material classification denotes separating polyurethane foam and fiber from ASR.

In accordance with an exemplary embodiment, as shown in FIG. 1, the first separating machine 20 may include a variety of separators, such as a vibration separator 12, a magnetic separator 13, and a rake-shaped fiber separator 22. For example, the separators can be configured such that dirt may be separated at the front portion of the first separating machine 20, metals may be separated at the central portion, while polyurethane foam and fiber may be separated at the rear portion. In certain embodiments, polyurethane foam and fiber of a certain size, such as a large size of about 100 mm or larger, are separated at the rear portion.

The vibration separator 12 may be configured in accordance with known vibration separators and, for example, may have a belt structure of a vibration conveyor type that is inclined at a certain angle. For example, an inlet to which ASR is inputted may be higher, and an outlet through which it is discharged may be lower.

As shown in FIG. 1, in an exemplary embodiment the vibration separator 12 may include a first hopper 10 disposed at the inlet. ASR may be inputted into the first hopper 10 of the vibration separator 12 through a bucket feeder 21 or the like that moves up and down by any suitable means. ASR inputted through the first hopper 10 may fall on the inlet of the vibration separator 12, and may be transferred along the vibration conveyer-type belt that generates vibration. In this case, fine particles such as dirt and glass pieces may be filtered. The filtered particles may be transferred to a separate storage container.

As shown in FIG. 1, the magnetic separator 13 may be disposed at a central portion of the vibration separator 12. The magnetic separator 13 may extract metals from ASR transferred along the vibration conveyer-type belt by a magnetic force. The extracted metals may be transferred to a metal collection box 14.

As shown in FIG. 1, the rake-shaped fiber separator 22 may be disposed at a rear portion of the vibration separator 12. In accordance with an exemplary embodiment, the rake-shaped separator may be a roller type separator having blades. For example, a plurality of blades having a rake-like shape may be disposed on a cylindrical rotary body at any suitable interval. The blades can be configured and arranged such that particles having a desired size, for example relatively large sizes, may be separated from ASR by the rake-shaped blades that rotate. For example, particles having relatively large sizes may include polyurethane and fiber having a size of about 100 mm or more.

The large-sized polyurethane and fiber that are filtered by the rake-shaped fiber separator 22 may be transferred to a first intermediate storage tank 23 to be recycled.

Further, foreign substances, such as dirt, glass pieces, etc., may be transferred to a foreign substance collection box 15, and may be removed from the ASR.

After the separation of the first separator 20, remaining materials may be transferred from the rear end of the first separator 20 to the second separator 30, for example, through a first transfer conveyor 11 as shown in FIG. 1.

The second separator 30 may include a first grinder 31a and a second grinder 31b. In an exemplary embodiment, the first grinder 31a has one shaft with a knife-like part disposed at an upper portion thereof, and the second grinder 31b has three shafts each with a knife-like part disposed at a lower portion thereof. Of course, the second separator 30 could also include a single grinder or more than two grinders (e.g., three, four, etc), and the first and second grinders 31a, 31b, as well as any other grinders, could also be provided with different numbers of shafts other than described in the exemplary embodiment (e.g., 2, 4, 5, etc).

The grinders 31a and 31b may grind materials remaining after the separation of the first separator 20 into fine particles. This grinding process may allow certain materials to be separated, and may reduce the volume of ASR to facilitate the disposal of scrapped materials.

In an exemplary embodiment, the grinder 31a having one or more of the knife type shafts may have cutting blades (not shown) integrally formed on the rotary body that rotates. The cutting blades may be configured and arranged to cut ASR into fine shreds.

Remaining materials after the separation of the first separator 20 may be inputted into the second separator 30 through a second hopper 34 or the like which can be located over the grinders 31a and 31b as shown in FIG. 1. The remaining materials are primarily ground by the first grinder 31a, and then may drop down to the second grinder 31b to be further ground by the second grinder 31b which can, for example, have a plurality (e.g., three) of shafts.

ASR ground by the first separator 30 may be transferred to the third separator 40 by a second transfer conveyor 32.

The third separator 40 may separate primarily-filtered ASR using a combination of wind and a roller separator. In accordance with an exemplary embodiment, ASR separated by the third separator 40 may be mostly polyurethane foam and fiber having medium sizes (e.g., about 50 mm to about 100 mm). In certain embodiments, remaining ASR may drop down and pass through a zigzag shaker or the like. In this case, polyurethane foam that is not filtered by the upper end portion of the second separator 30 may be separated, and other plastics may drop down to be separately sorted and transferred to a plastic collection box.

In this case, polyurethane foam separated by the second separator 30 may be transferred to a second intermediate storage tank 33 to be recovered.

As shown in FIG. 1, the third separator 40 may include an input hopper 41, a roller-type fiber separator 42, and an airflow and mesh plate-type separator 43.

The input hopper 41 may serve to receive ASR transferred by the second transfer conveyor 32 and deliver the ASR to the fiber separator 42.

The fiber separator 42, which is preferably a roller-type separator, may sort polyurethane foam and fiber of ASR by size, for example, according to an interval between rollers.

The airflow and mesh plate-type separator 43 can separate materials of ASR according to their weight by causing light residues to float by air/wind and heavy residues to sink. Also, the airflow and mesh plate-type separator 43 may sort ASR by mesh-size by allowing suitably sized sinking residues to pass through a mesh plate.

Polyurethane foam may be finally separated to be stored in a polyurethane foam collection box 45, by removing foreign substances using, for example, a dust collector 44 after polyurethane foam and fiber are additionally sorted by the third separator 40.

As shown in FIG. 2, ASR that has undergone the above processes may be roughly classified into five types of material such as dirt, plastics, rubber, composite, fiber, and polyurethane foam.

As shown, of the five types of material shown in FIG. 2, polyurethane foam and fiber may be recovered and recycled as vehicle materials.

According to an embodiment of the present invention, a large quantity of polyurethane foam and fiber can be efficiently separated based on the characteristics of ASR, including the differences in specific gravity of the various materials. In accordance with an embodiment of the invention, an optimal processing capacity of the apparatus may be about 3 ton/hr, and a maximum processing capacity thereof may range from about 4 ton/hr to about 5 ton/hr.

Using the separation apparatus in accordance with the exemplary embodiment of the present invention as depicted and described in connection with FIG. 1, about 1,000 kg ASR was run through and separated in three experiments, and the results that were obtained are represented in Table 2.

TABLE 2

| Division | | PU Foam | Fiber | Plastic | Rubber | Others | Loss | Total |
|---|---|---|---|---|---|---|---|---|
| 1 | Weight (kg) | 160 | 150 | 200 | 140 | 200 | 150 | 1,000 |
|   | Ratio (%) | 16.0 | 15.0 | 20.0 | 14.0 | 20.0 | 15.0 | 100 |
| 2 | Weight (kg) | 155 | 160 | 199 | 130 | 210 | 146 | 1,000 |
|   | Ratio (%) | 15.5 | 16.0 | 19.9 | 13.0 | 21.0 | 14.6 | 100 |
| 3 | Weight (kg) | 158 | 170 | 180 | 120 | 250 | 122 | 1,000 |
|   | Ratio (%) | 15.8 | 17.0 | 18.0 | 12.0 | 25.0 | 12.2 | 100 |

As shown in Table 2, the average selective separation ratio of polyurethane foam, fiber, plastic, rubber, other materials, and the amount of loss was 157 kg (15.8%), 160 kg (16%), 193 kg (19.3%), 130 kg (13%), 220 kg (22%), and 139.3 kg (13.9%), respectively.

Accordingly, an apparatus for selectively separating polyurethane foam and fiber from ASR according to an embodiment of the present invention can increase the recovery rate of metal and save costs for processing scrapped vehicles, by selectively separating polyurethane and fiber from ASR.

In addition to selective separation of polyurethane foam and fiber, other materials can also be separated and recycled. Thus, the environmental load can be minimized and the recycling rate of scrapped vehicles can be improved when using the present apparatus and method.

In particular, separation of polyurethane and fiber that has been manually performed can now be automatically performed using the present invention. As a result, polyurethane foam and fiber can be stably supplied as recyclable materials by expanding the selective separation of polyurethane and fiber into a vehicle junkyard and obtaining the quantity of polyurethane foam and fiber.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for selectively separating polyurethane foam and fiber from Automobile Shredder Residue (ASR), the apparatus comprising:
    a first section configured to separate fine particles including dust and glass particles from the ASR at a front portion thereof, and to subsequently separate large-sized polyurethane foam and fiber having a size of at least about 100 mm from the ASR at a rear portion thereof,
    wherein the front portion of the first section comprises a vibration separator and a magnetic separator; and the rear portion of the first section comprises a rake-shaped fiber separator having a plurality of blades of shafts for selectively separating the large polyurethane foam and fiber from the ASR;
    a second section configured to grind the remaining ASR except the fine particles and large-sized polyurethane foam and fiber after the primary separation by the first section,
    wherein the second section is disposed between the first section and third section, and comprises a first grinder having one shaft with a blade part disposed at an upper portion thereof and a second grinder having three shafts each with a blade part disposed at a lower portion thereof and, the remaining ASR after the separation from the first section is crushed and ground by the first grinder and the second grinder; and
    a third section configured to first separate medium-sized polyurethane foam and fiber having a size ranging from about 50 mm to about 100 mm from the ground ASR after the second section, and configured to subsequently separate plastics, rubber, and the remaining ASR materials after separating medium-size polyurethane foam and fiber,
    wherein the third section comprises: a roller fiber separator configured to separate the medium-sized polyurethane foam and fiber from the remaining ASR after the first section by size according to an interval between rollers; an airflow configured to perform selective separation according to a weight of the ASR using airflow; and mesh plate separator configured to selectively separate the ASR by size according to mesh size of a mesh plate,
    wherein the first section and the second section are connected to each other so that the remaining ASR after the separation of the first section is transferred from the rear of the first section to the second section through a first transfer conveyer; and the second section and the third section are connected to each other so that the ground ASR in the second section is transferred to the third separator by a second transfer conveyer.

2. The apparatus of claim 1, wherein the ASR is classified into polyurethane foam and fiber by the first separator and the third separator, and is collected by a dust collector to allow the polyurethane foam to be finally separated from the ASR.

3. A method for selectively separating polyurethane foam and fiber from Automobile Shredder Residue (ASR) using the apparatus of claim 1.

* * * * *